United States Patent
Nishiura et al.

(10) Patent No.: US 9,277,189 B2
(45) Date of Patent: Mar. 1, 2016

(54) MONITOR CAMERA CONTROLLER (71) Applicant: HITACHI, LTD., Tokyo (JP)

(72) Inventors: Hiromi Nishiura, Fujisawa (JP);
Toshihiro Kato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 13/938,712

(22) Filed: Jul. 10, 2013

(65) Prior Publication Data
US 2014/0036089 A1 Feb. 6, 2014

(30) Foreign Application Priority Data
Jul. 31, 2012 (JP) .................................. 2012-169095

(51) Int. Cl.
*H04N 7/18* (2006.01)
*H04N 5/232* (2006.01)
*G08B 13/196* (2006.01)
*H04N 5/247* (2006.01)
*H04N 5/262* (2006.01)

(52) U.S. Cl.
CPC ........... *H04N 7/181* (2013.01); *H04N 5/23206* (2013.01); *G08B 13/19641* (2013.01); *G08B 13/19689* (2013.01); *H04N 5/247* (2013.01); *H04N 5/2624* (2013.01)

(58) Field of Classification Search
CPC ......... H04N 7/181; H04N 7/18; H04N 5/232; H04N 7/185; H04N 5/23216; G08B 13/19656; G08B 13/19645; G08B 13/19689
See application file for complete search history.

(56) References Cited

U.S. PATENT DOCUMENTS

| 6,137,485 | A | * | 10/2000 | Kawai et al. | 715/719 |
| 6,646,677 | B2 | * | 11/2003 | Noro et al. | 348/156 |
| 6,714,238 | B2 | * | 3/2004 | Urisaka et al. | 348/211.99 |
| 6,919,921 | B1 | * | 7/2005 | Morota et al. | 348/211.11 |
| 7,515,176 | B2 | * | 4/2009 | Sasaki | 348/211.6 |
| 2002/0056122 | A1 | * | 5/2002 | Yokoyama et al. | 725/87 |
| 2008/0278582 | A1 | * | 11/2008 | Chung et al. | 348/159 |
| 2012/0169842 | A1 | * | 7/2012 | Chuang et al. | 348/39 |

FOREIGN PATENT DOCUMENTS

JP 06-086290 A 3/1994

* cited by examiner

*Primary Examiner* — Jay Patel
*Assistant Examiner* — Neil Mikeska
(74) *Attorney, Agent, or Firm* — Volpe and Koenig, P.C.

(57) ABSTRACT

A function of being controlled by a second monitor camera controller is added to a first monitor camera controller which controls a plurality of monitor cameras. The second monitor camera controller is caused to recognize the first monitor camera controller as a monitor camera. The first monitor camera controller synthesizes videos from the monitor cameras as one video, and transmits the synthetic video to the second monitor camera controller. Control of the monitor cameras or acquisition of videos is conducted by controlling the first monitor camera controller recognized as a monitor camera by use of a control function of a part or all of pan, tilt and zoom.

10 Claims, 10 Drawing Sheets

VIDEOS OF RESPECTIVE MONITOR CAMERAS

VIDEO AFTER SYNTHESIS

| ID | MONITOR CAMERA | RANGE (X) | RANGE (Y) |
|---|---|---|---|
| 1 | 201 | $-960 \leq X \leq 0$ | $0 \leq Y \leq 540$ |
| 2 | 202 | $-960 \leq X \leq 0$ | $-540 \leq Y < 0$ |
| 3 | 203 | $0 < X \leq 960$ | $0 \leq Y \leq 540$ |
| 4 | 204 | $0 < X \leq 960$ | $-540 \leq Y < 0$ |

MONITOR CAMERA CONTROLLER

INCORPORATION BY REFERENCE

The present application claims priority from Japanese application JP2012-169095 filed on Jul. 31, 2012, the content of which is hereby incorporated by reference into this application.

BACKGROUND OF THE INVENTION

The present invention relates to a monitor camera controller.

As for the background art of the present technical field, JP-A-6-86290 can be mentioned. Therein, there is a description "in an ITV remote multipoint monitoring system configured to transmit video information from at least two ITV cameras in a monitoring area 1 to a remote monitoring station 4 though a transmission line 3 and monitor the video information in the monitoring station 4, signals from respective ITV cameras 2 are collected by a video synthesizing device 5 installed on the monitoring area 1 side and transmitted to the monitoring station 4."

SUMMARY OF THE INVENTION

According to the technique described in JP-A-6-86290, videos of the monitoring area are controlled from the monitoring station 4, the videos are synthesized by using the video synthesizing device, and a resultant synthetic video is received. Therefore, it is difficult for another monitoring station to control the individual cameras.

The present invention provides a monitor camera controller capable of conducting video acquisition and control of a plurality of monitor cameras or a specific monitor camera from multiple points while suppressing the network load.

The following is a brief description of representative aspects of the invention disclosed herein.

(1) According to a first aspect, the present invention provides a monitor camera controller capable of controlling a plurality of monitor cameras connected via a network, the monitor camera controller including an information receiver for receiving a first control request from a second monitor camera controller which is connected via the network and which is different from the monitor camera controller, information from the plurality of monitor cameras, or videos of the plurality of monitor cameras, a control request converter for analyzing the received first control request and converting the received first control request to a second control request which can be received by the plurality of monitor cameras, an information transmitter for transmitting the second control request to the plurality of monitor cameras, and a video synthesizer for synthesizing videos respectively of the plurality of monitor cameras which are transmitted from the plurality of monitor cameras on the basis of the second control request transmitted from the information transmitter and which are received by the information receiver, a video obtained by the synthesizing in the video synthesizer being transmitted to the second monitor camera controller by the information transmitter.

(2) According to a second aspect, the present invention provides the monitor camera controller described in (1), further including a position converter capable of specifying positions where videos respectively of the plurality of monitor cameras are arranged or selecting a monitor camera that is an object out of specific monitor cameras, when the video synthesizer synthesizes the videos respectively of the plurality of monitor cameras received by the information receiver, wherein the position converter discriminates a monitor camera for which a command is given, by issuing a capability inquiry request concerning a part or all of pan, tilt, and zoom to the plurality of monitor cameras, and selects the object monitor camera, and the information transmitter transmits a video of the selected object monitor camera to the second monitor camera controller.

According to the present invention, it is possible to provide a monitor camera controller capable of conducting video acquisition and control of a plurality of monitor cameras or a specific monitor camera from multiple points while suppressing the network load.

Other objects, features and advantages of the invention will become apparent from the following description of the embodiments of the invention taken in conjunction with the accompanying drawings.

DESCRIPTION OF THE EMBODIMENTS

Hereafter, an example of an embodiment of the present invention will be described with reference to the drawings. However, the present invention is not restricted to the present embodiment.

Figure 1:
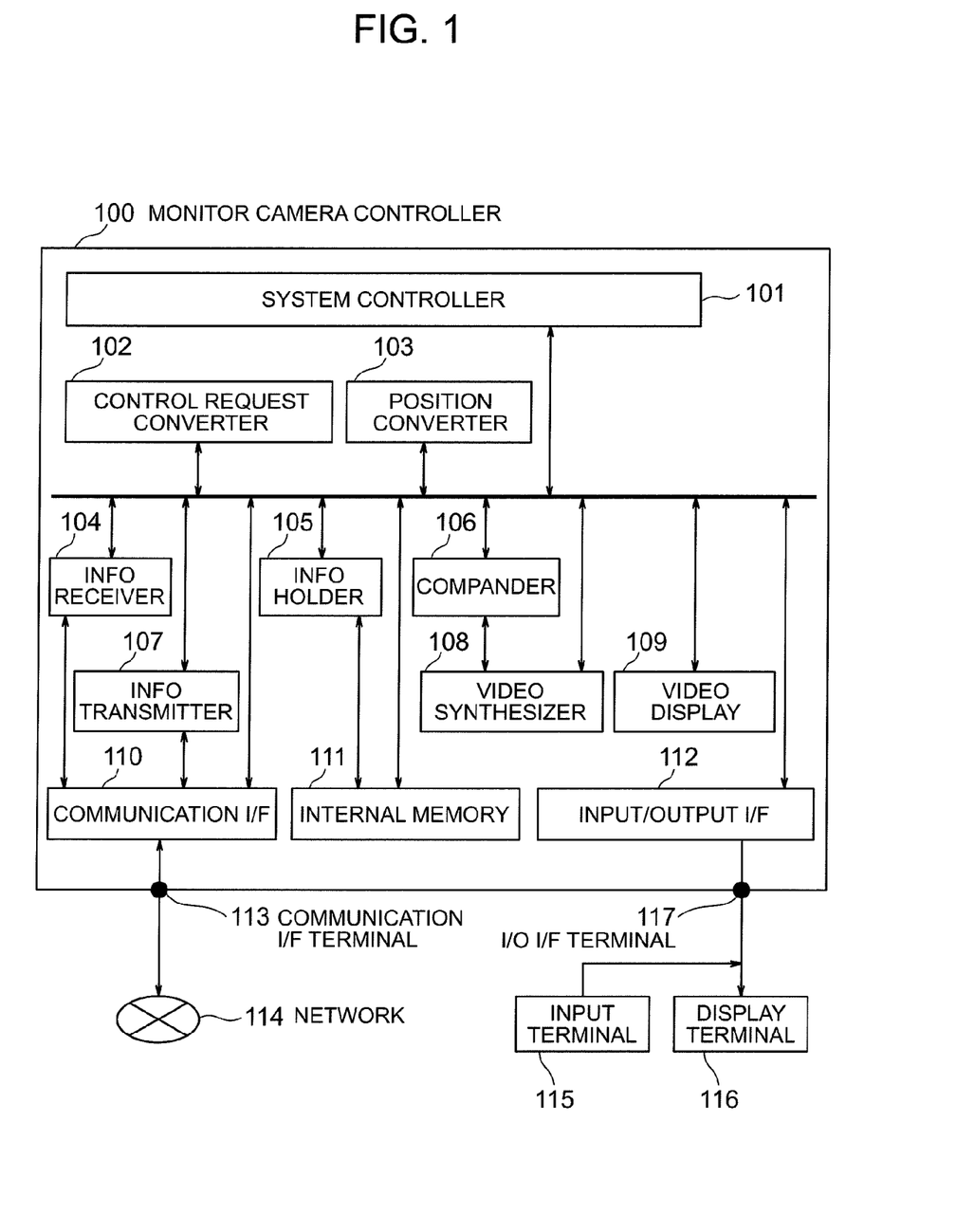
FIG. 1 shows a configuration of a monitor camera controller.

FIG. 1 is a diagram showing an example of a configuration of a monitor camera controller in the present embodiment. A monitor camera controller 100 is constituted by suitably using a system controller 101, a control request converter 102, a position converter 103, an information (info) receiver 104, an information holder 105, a compander 106, an information transmitter 107, a video synthesizer 108, a video display 109, a communication interface (I/F) 110, an internal memory 111, and an input/output (I/O) interface 112.

The system controller 101 controls the monitor camera controller 100 in conjunction with other units. The information receiver 104 receives information from another monitor camera controller or monitor camera connected via a network 114, through a communication interface terminal 113 and the communication interface 110. The information transmitter 107 transmits information toward a monitor camera connected via the network, through the communication interface 110 and the network.

The monitor camera controller 100 is controlled by control information which is received by the information receiver 104. The monitor camera controller 100 causes the control request converter 102 to convert the control information to a control request for a monitor camera connected via the network, and causes the information transmitter 107 to transmit the control request.

Information received by the information receiver 104 is held by the internal memory 111 through the information holder 105. The information holder 105 conducts information holding and reading processing. The holding destination is determined to be the internal memory 111 in the present example. Alternatively, it is possible to provide the monitor camera controller 100 with a configuration capable of mounting an external medium and hold the information in the external medium.

Video information received by the information receiver 104 is expanded by the compander 106 and synthesized by the video synthesizer 108 to obtain a desired video. A resultant synthetic video is transmitted through the information transmitter 107.

An input terminal 115 includes, for example, buttons, a keyboard and a mouse for controlling the monitor camera controller 100 and controlling a monitor camera or another monitor camera controller connected via the network, in the monitor camera controller 100. An input is accepted through an input/output interface terminal 117 and the input/output interface 112. Furthermore, display of a video received from a monitor camera and display of a GUI (Graphical User Interface) required to control a monitor camera or the monitor camera controller are conducted on a display terminal 116 through the video display 109 and the input/output interface terminal 117.

The monitor camera controller 100, the input terminal 115, and the display terminal 116 are configured separately. Alternatively, however, they may be configured collectively as one monitor camera controller. The input terminal 115 and the display terminal 116 are configured separately. Alternatively, however, a configuration in which the input operation and display are conducted on one terminal as in the touch panel display device may be used. As for communication, a unique communication protocol may be used for communication between the monitor camera controller and a monitor camera device. Alternatively, however, for example, a protocol based upon standard communication established by the ONVIF (Open Network Video Interface Forum) or the like may be used.

Figure 2:
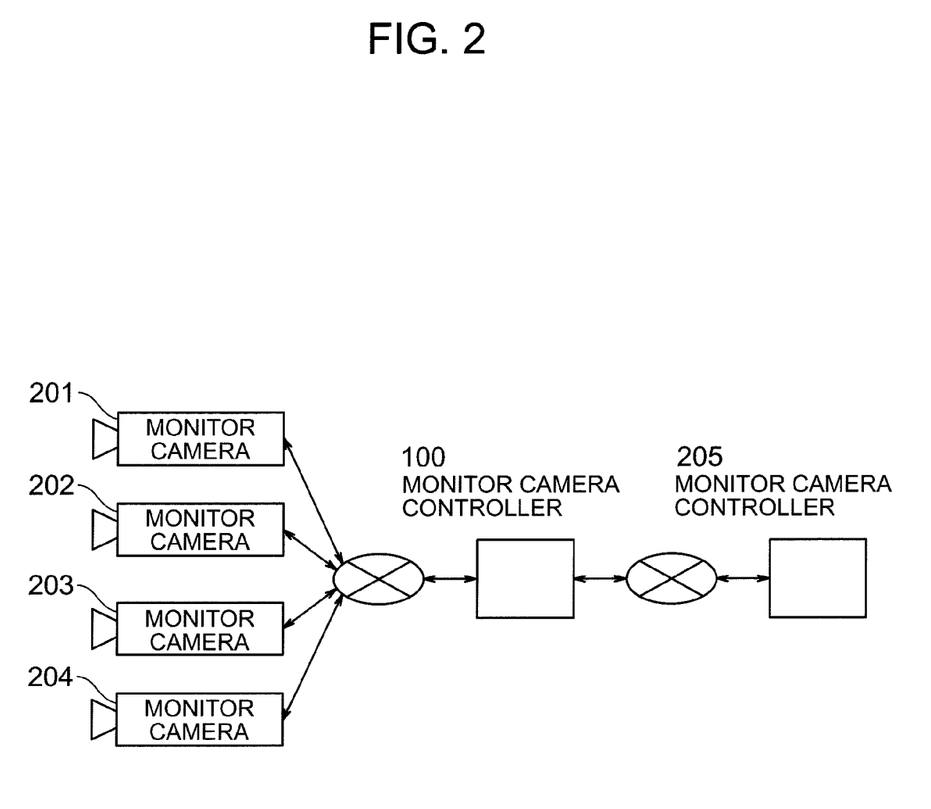
FIG. 2 shows a configuration of a monitor camera system.

FIG. 2 shows an example of a configuration of a monitor camera system using the monitor camera controller in the present embodiment. The monitor cameras refer to, for example, a plurality of monitor cameras 201, 202, 203 and 204. These monitor cameras are controlled by the monitor camera controller 100 in the present embodiment. Furthermore, it is possible to control the monitor camera controller 100 by using another monitor camera controller 205 and control the monitor camera 201 or the like through the monitor camera controller 100. As a matter of course, it is also possible to control the monitor camera 201 or the like directly by the monitor camera controller 205.

The monitor cameras 201 to 204 connected via the network are controlled by the monitor camera controller 100. The monitor camera controller 100 is controlled by another different monitor camera controller (the monitor camera controller 205) as well. At this time, the monitor camera controller 205 is caused to recognize the monitor camera controller 100 as one or a plurality of monitor cameras. As a result, it becomes possible for the monitor camera controller 205 to control the monitor camera controller 100 and further control the monitor cameras 201 to 204 by using a method for controlling a monitor camera.

Figure 3:
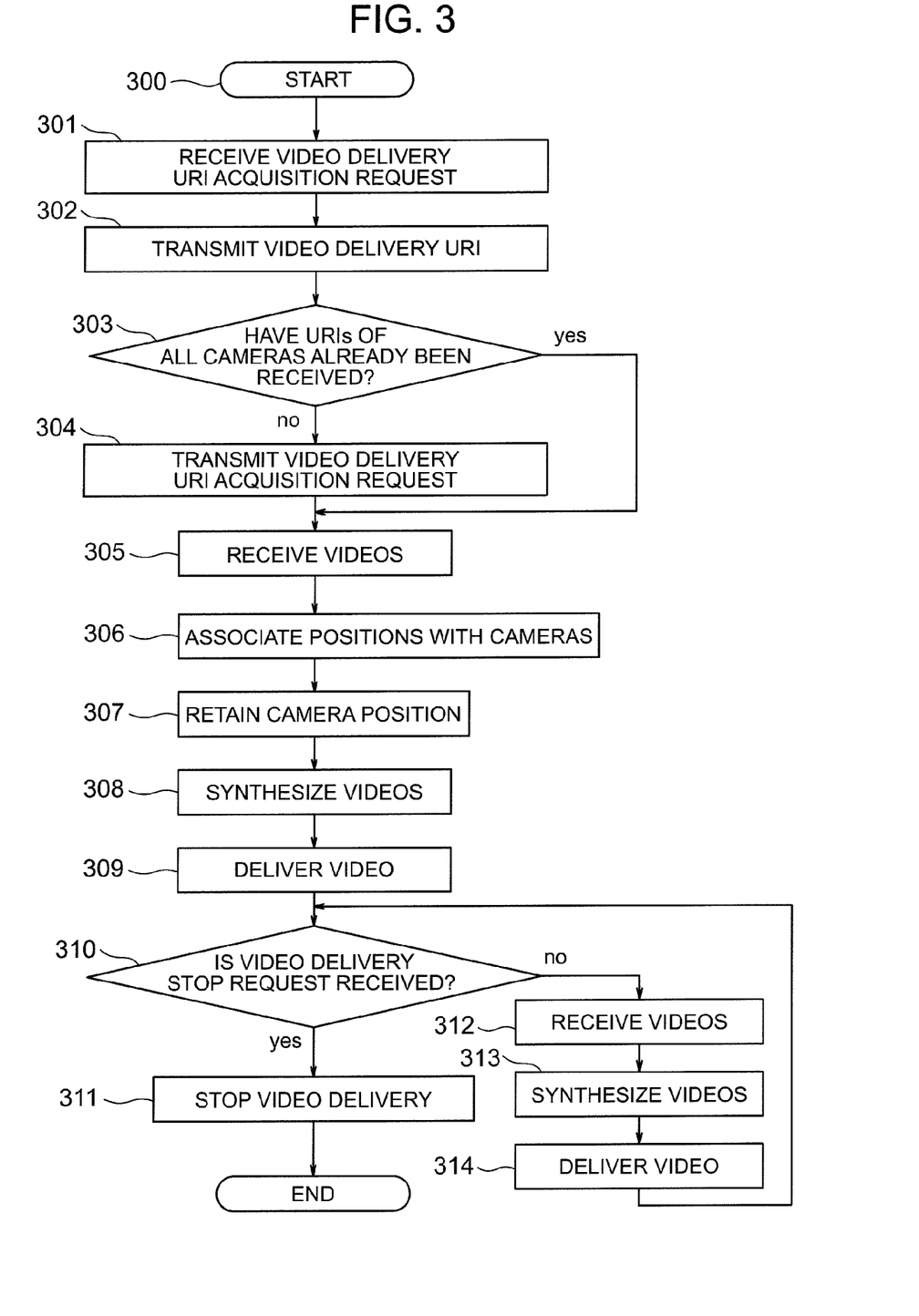
FIG. 3 shows a flow of video delivery from the monitor camera controller.

FIG. 3 is a diagram showing a flow of processing at the time when the monitor camera controller 100 receives videos from the monitor cameras 201 to 204 and transmits a video to the monitor camera controller 205.

At step 301, an acquisition request for an identifier which identifies video delivery, such as, for example, a URI (Uniform Resource Identifier) is received from the monitor camera controller 205. In the ensuing description, the identifier is supposed to be the URI. At step 302, a URI for delivering a video is transmitted to the monitor camera controller 205. This URI is previously held in the internal memory. For transmitting a video to the monitor camera controller 205, it is necessary for the monitor camera controller 100 to receive a video from the monitor camera 201. Therefore, it is necessary for the monitor camera controller 100 to previously acquire a URI for delivering the video of the monitor camera 201. At step 303, therefore, a decision is made whether URIs of all monitor cameras have already been received. If URIs of all monitor cameras have already been received, the processing proceeds to step 305. Unless URIs of all monitor cameras have already been received, a video delivery URI acquisition request is transmitted to a monitor camera which is an object at step 304 and the URI is acquired. Videos are received from the monitor cameras 201 to 204 by using the acquired URIs at step 305.

At step 306, positions at the time when synthesizing and arranging the videos are associated with the monitor cameras. This conversion of position information is conducted by the position converter 103. At step 307, camera position information is held in the internal memory or the like.

At step 308, videos are received and expanded by the compander 106, and then a plurality of videos are synthesized by the video synthesizer 108. At step 309, a video obtained by the synthesis is compressed by the compander 106, and then transmitted to the monitor camera controller 205.

So far, the processing conducted when a delivery request is issued by the monitor camera controller 205 has been described. After the delivery is started, a decision is made whether a video delivery stop request has been received from the monitor camera controller 205 at step 310. If the video delivery stop request has been received, the video delivery is stopped at step 311. Unless the video delivery stop request has been received, videos are received from the monitor cameras 201 to 204 at step 312, expansion, synthesis and compression of the received videos are conducted at step 313, and a resultant video is delivered at step 314. The processing is repeated until a video delivery stop request is received.

When acquiring a URI for delivering a video at the step 301, a unique communication protocol may be used or a standardized communication protocol may be used. For example, in the case of ONVIF standards, a command such as GetStreamURI can be used.

Figure 4:
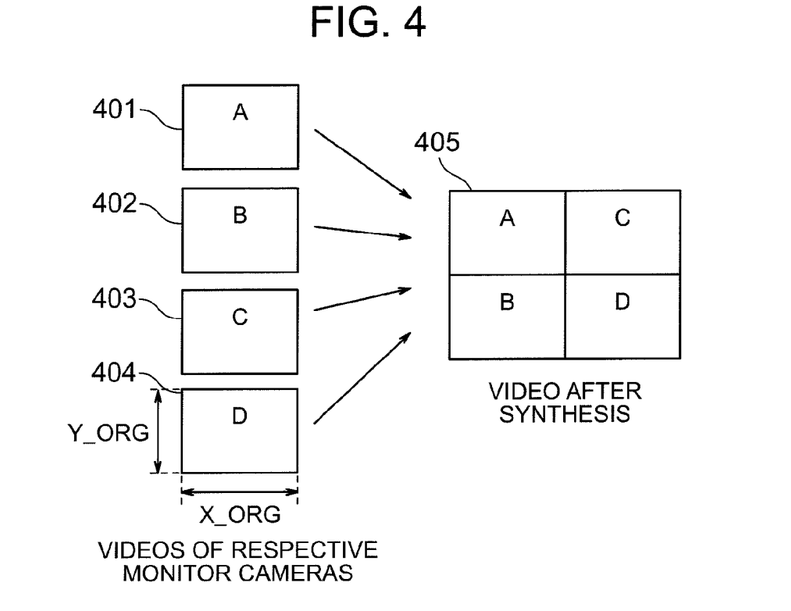
FIG. 4 shows an example of video synthesis.

FIG. 4 shows an example of video synthesis at the time when synthesizing videos of the monitor cameras 201 to 204. Reference numeral 401 denotes a video (represented as A) of the monitor camera 201. Reference numeral 402 denotes a video (represented as B) of the monitor camera 202. Reference numeral 403 denotes a video (represented as C) of the monitor camera 203. Reference numeral 404 denotes a video (represented as D) of the monitor camera 204. The four videos of the monitor cameras 201 to 204 are synthesized as one video and a synthetic video 405 is obtained.

Sizes of videos of all monitor cameras are made equal. Alternatively, however, they may be different. Video sizes of all monitor cameras after the synthesis are also made equal. However, they may be different, or they may be suitably changed automatically or according to a request. For use in the ensuing description, the X-direction size of the video of the monitor camera 204 is referred to as X_ORG and the Y-direction size of the video of the monitor camera 204 is referred to as Y_ORG.

Figure 5:
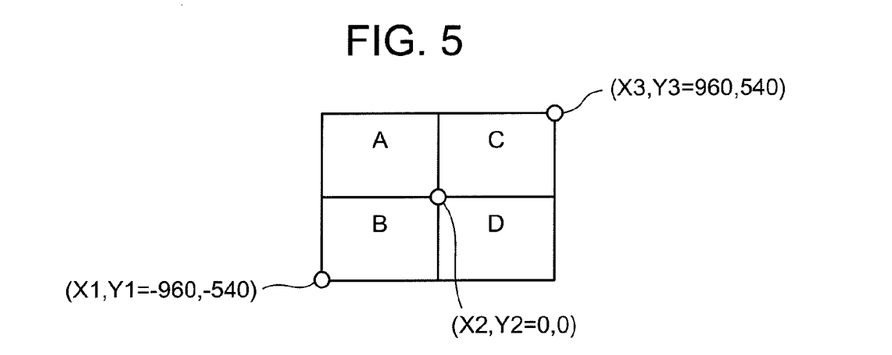
FIG. 5 shows an example of coordinates at time of video synthesis.

As an example of coordinates at the time of video synthesis, information concerning positions after the videos of the monitor cameras 201 to 204 are synthesized is shown in FIG. 5. For example, when coordinates of a left bottom end of the video of the monitor camera 202 are represented by (X1, Y1), it is supposed that X1=−960 and Y1=−540. When coordinates of a right top end of the video of the monitor camera 202 are represented by (X2, Y2), it is supposed that X2=0 and Y2=0. When coordinates of a right top end of the video of the monitor camera 203 are represented by (X3, Y3), it is supposed that X3=960 and Y3=540. The X-direction size of the video of the monitor camera 204 is referred to as X, and the Y-direction size of the video of the monitor camera 204 is referred to as Y. Here, a center of the synthetic video is set to be the origin. However, a left bottom end (X1, Y1) of the synthetic video may be set to be the origin.

Figure 6:
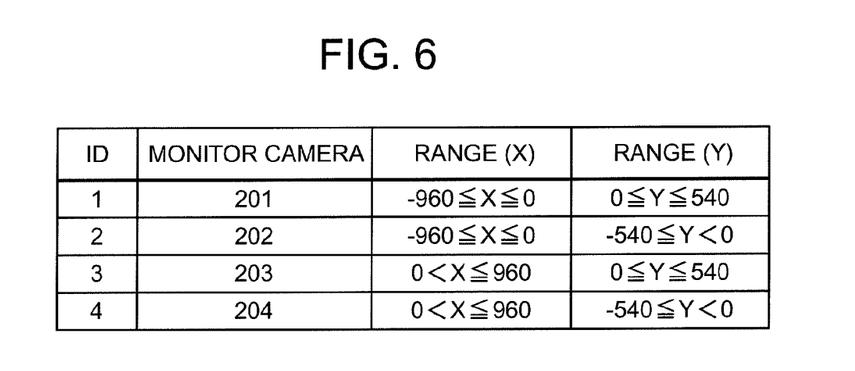
FIG. 6 shows an example of position conversion information of a monitor camera.

FIG. 6 shows an example of position conversion information of the monitor cameras in the case where the videos are arranged and coordinates are configured as shown in FIG. 5. Ranges of arrangement positions of the monitor cameras 201 to 204 are shown. This information is held in the internal memory or the like.

Figure 7:
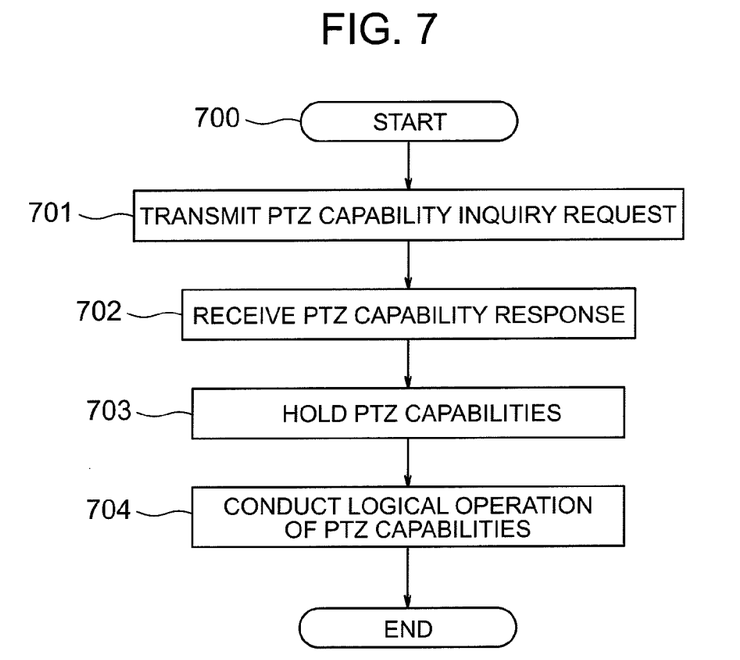
FIG. 7 shows a processing flow of the monitor camera controller at time of a PTZ (Pan, Tilt, and Zoom) capability inquiry request.

FIG. 7 shows a processing flow of the monitor camera controller at the time when issuing a pan-tilt-zoom inquiry request to connected monitor cameras. Hereafter, when referring to the pan, tilt, and zoom collectively, they will be abbreviated to PTZ. At step 701, a PTZ capability inquiry request is transmitted to the monitor cameras 201 to 204. At step 702, a PTZ capability response is received. At step 703, received PTZ capabilities are associated with the monitor cameras 201 to 204 and held in the internal memory or the like. At step 704, a logical operation of PTZ capabilities is conducted by using the held PTZ capabilities. Furthermore, a result of the logical operation may be held in the internal memory.

Here, the response to the PTZ capability inquiry is a response concerning the capability such as, for example, whether there is a PTZ performing function, maximum values or minimum values in the X direction and Y direction allowing the pan and tilt, zoom magnifications, and operation speeds of them.

At the step 704, the logical operation of PTZ capabilities is conducted. Alternatively, however, a logical sum operation may be conducted, or a logical product operation may be conducted. Or instead of a logical operation of PTZ capabilities of all monitor cameras, a logical operation may be conducted by causing the PTZ capability of a specific monitor camera to take preference.

When issuing the PTZ capability inquiry request at the step 701, a unique communication protocol may be used, or a standardized communication protocol may be used. For example, in the case of the ONVIF standards, commands such as GetConfiguration, GetConfigurations, GetConfigurationOptions, GetNode, and GetNodes can be used singly or in combination.

Figure 8:
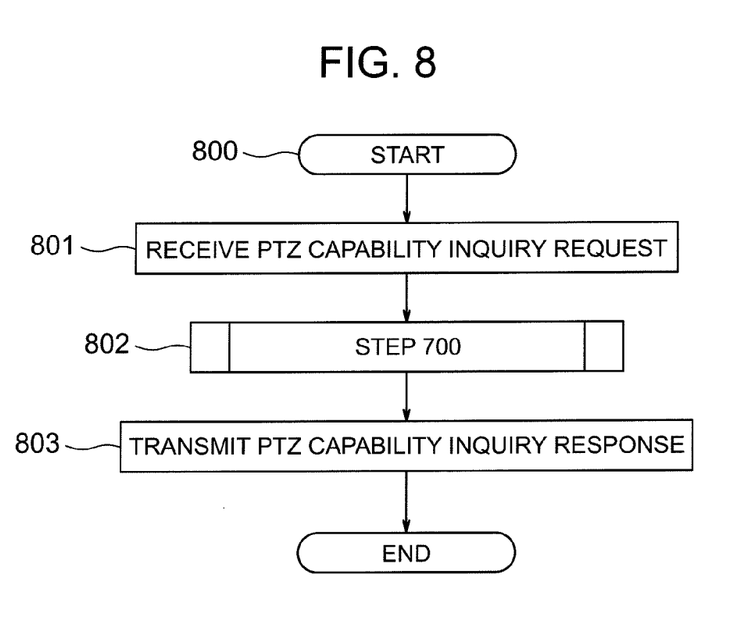
FIG. 8 shows a processing flow of each monitor camera at time of a PTZ capability inquiry request.

FIG. 8 shows a flow of PTZ capability inquiry request processing conducted by the monitor camera controller 100 when the monitor camera controller 100 has received a PTZ capability inquiry request from the monitor camera controller 205.

At step 801, the monitor camera controller 100 receives the PTZ capability inquiry request. Then, the monitor camera controller 100 generates capability information to be given as a response, in the PTZ capability inquiry request processing flow shown in FIG. 7. At step 803, the monitor camera controller 100 transmits a response to the PTZ capability inquiry to the monitor camera controller 205. If the step 700 is already executed, the step 700 may not be executed and the result of the logic operation held in the internal memory may be transmitted as a response.

Even if not all of the monitor cameras 201 to 204 have the PTZ capability, a logical operation is conducted for pseudo-possible control and a result is transmitted as a response. For example, in the case of FIG. 5, a logical operation is conducted supposing that the direction of the pan and tilt depend upon the coordinates, the maximum value in the X direction is 540, the minimum value in the X direction is −540, the maximum value in the Y direction is 960, the minimum value in the Y direction is −960, and the pan and tilt are possible. And a result is transmitted as a response. The maximum values and the minimum values need only be values other than 0 as long as they indicate that the pan and tilt are possible in both the positive direction and the negative direction. As a result, pseudo-control for causing a monitor camera to pan and tilt can lead to selection and control of each monitor camera.

Figure 9:
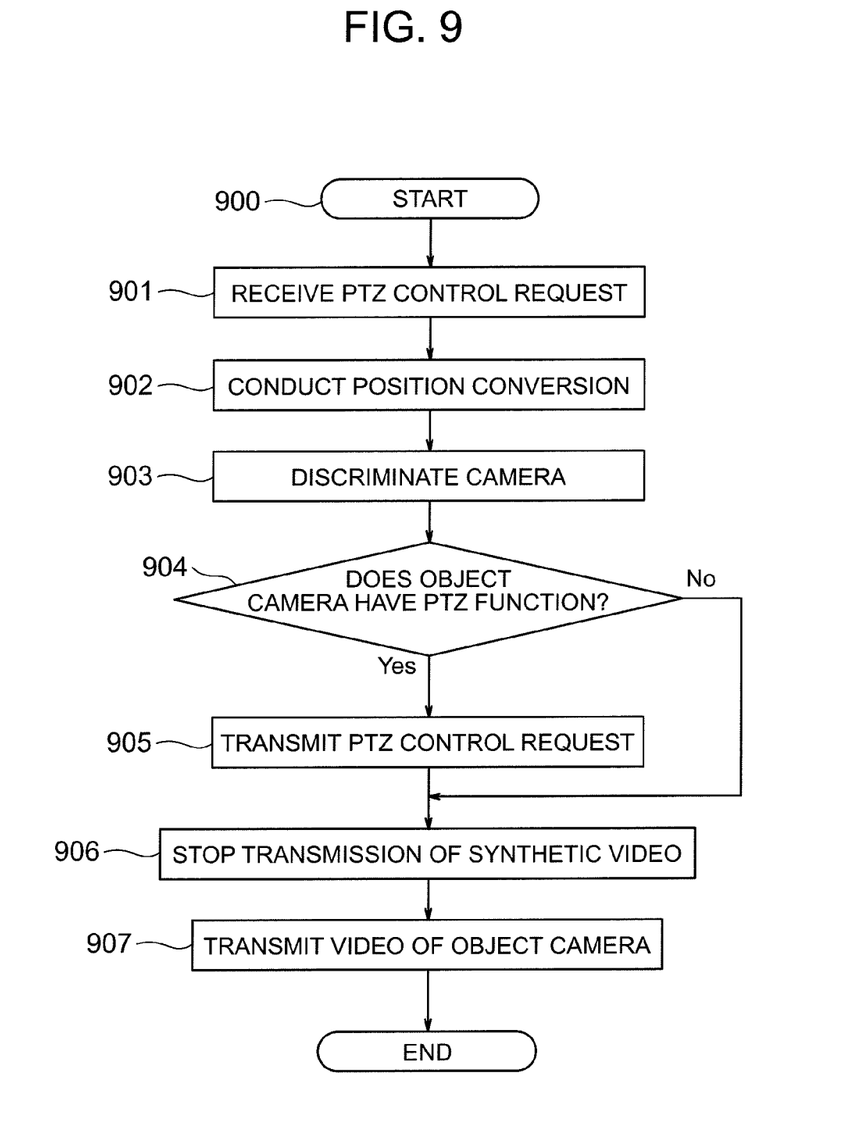
FIG. 9 shows a processing flow at time of a PTZ control request.

FIG. 9 shows a processing flow for the monitor camera controller 100 to cause delivery of a video of a specific camera in response to the PTZ control request from the monitor camera controller 205.

At step 901, a PTZ control request is received from the monitor camera controller 205. At step 902, the position converter 103 calculates supposed center coordinates after PTZ control. At step 903, a monitor camera that becomes the object is discriminated according to the calculated coordinates. For example, if a request that indicates 100 in the X direction and −20 in the Y direction in the coordinate example shown in FIG. 5 is received as PTZ control information, it can be discriminated that the area of the monitor camera 204 is indicated.

At step 904, a decision is made whether the object monitor camera has the PTZ function. If the object monitor camera does not have the PTZ function, the processing proceeds to step 905. As to whether the object monitor camera has the PTZ function, the monitor camera may be inquired of each time, or information held in the internal memory may be utilized. It is more efficient to utilize the information held in the internal memory.

At step 905, a PTZ control request is issued to the object monitor camera. However, the PTZ control information received from the monitor camera controller 205 is not transmitted as it is, but PTZ control values calculated from received PTZ control values by using the position converter 103 on the basis of the direction and zoom position of the object monitor camera are transmitted.

By issuing the PTZ control request, the position converter 103 has selected the object monitor camera out of a plurality of monitor cameras. At step 906, therefore, the delivery of the synthetic video which has been transmitted until then is stopped. At this time, the monitor camera controller 100 continues monitoring. Therefore, the monitor camera controller 100 receives the videos from the monitor cameras 201 to 204, and continues to display them on, for example, the display terminal 116. However, the monitor camera controller 100 does not conduct the video synthesis processing and the delivery of the synthetic video.

At step 907, the video of the monitor camera that is the object specified by the monitor camera controller 205 is transmitted to the monitor camera controller 205.

A method for calculating the PTZ control information for the monitor camera 204 in the case of the above-described example (in which the request of 100 in the X direction and −20 in the Y direction is received) at the step 905 will now be described. It is supposed that an origin of PTZ of the monitor camera 204 is a center part of a screen of the monitor camera 204.

PTZ control information for the monitor camera 204 becomes $-(X3/2-100)*(X3-X1)/X\_ORG$ in the X direction and $(-20-(Y1/2))*(Y3-Y1)/Y\_ORG$ in the Y direction. ("*" is a multiplication operater.) The operation is conducted by the position converter 103, and a result is transmitted to the object monitor camera 204 as PTZ control information.

Here, an example of PTZ control using absolute values from the current direction and zoom position of the monitor camera 204 has been described. Alternatively, the monitor camera controller 100 may previously retain the PTZ position of the monitor camera 204 in the internal memory and exercise the PTZ control of the monitor camera 204 using relative values.

Figure 10:
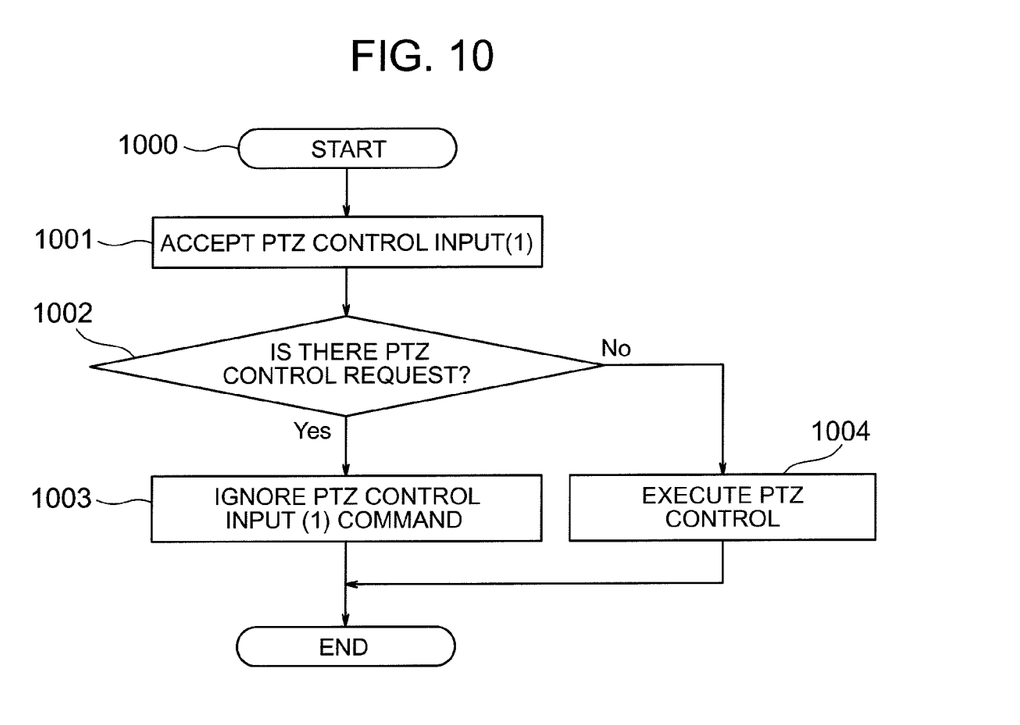
FIG. 10 shows a processing flow at time of a PTZ control input.

FIG. 10 is a diagram showing a processing flow in cases where there is PTZ control on the monitor camera controller 100 from the input terminal 115.

At step 1001, a PTZ control input (1) from the input terminal 115 is accepted. At step 1002, a decision is made whether there is a PTZ control request from the monitor camera controller 205. If there is a PTZ control request from the monitor camera controller 205, the processing proceeds to step 1003. Unless there is a PTZ control request from the monitor camera controller 205, the processing proceeds to step 1004. At the step 1003, the PTZ control request from the monitor camera controller 205 is already received and the PTZ control input command from the input terminal 115 is ignored in order to cause this control to take preference. At step 1004, the monitor camera controller 100 has the right to control the monitor cameras 201 to 204 and consequently the monitor camera controller 100 issues a PTZ control request to a monitor camera as commanded. As an exceptional mode, there may be a mode in which the control right is forcibly given to the monitor camera controller 100 even if the monitor camera controller 100 is receiving a PTZ control request from the monitor camera controller 205.

Figure 11:
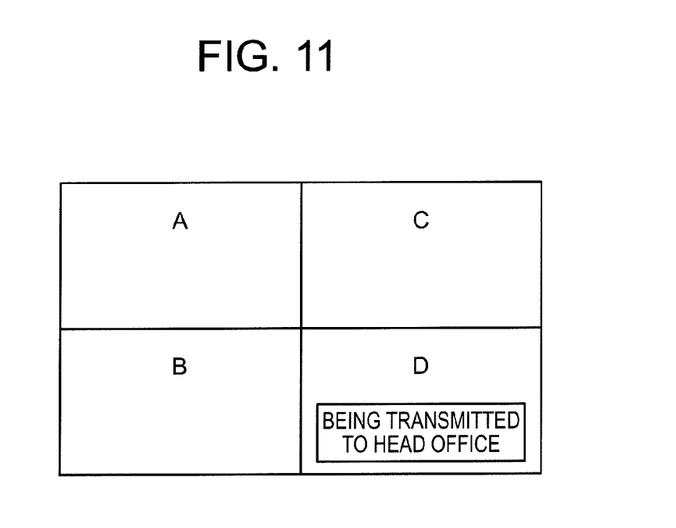
FIG. 11 shows a display screen at time of PTZ control.

If a PTZ control request is issued from the monitor camera controller 205, a display as shown in FIG. 11 is conducted to inform a user who administers the monitor camera controller 100 that the object monitor camera is being controlled and a video of the object monitor camera is being transmitted to the monitor camera controller 205. In the present example, it is indicated that a video of the monitor camera 204 is being transmitted to the monitor camera controller 205 by displaying an expression such as "being transmitted to head office" or a mark on the video of the monitor camera 204. The display indicating that the video is being transmitted is not restricted to the above-described representation, but for only the video of the object monitor camera, lowering of the luminance, reducing the size, or framing may be conducted.

Figure 12:
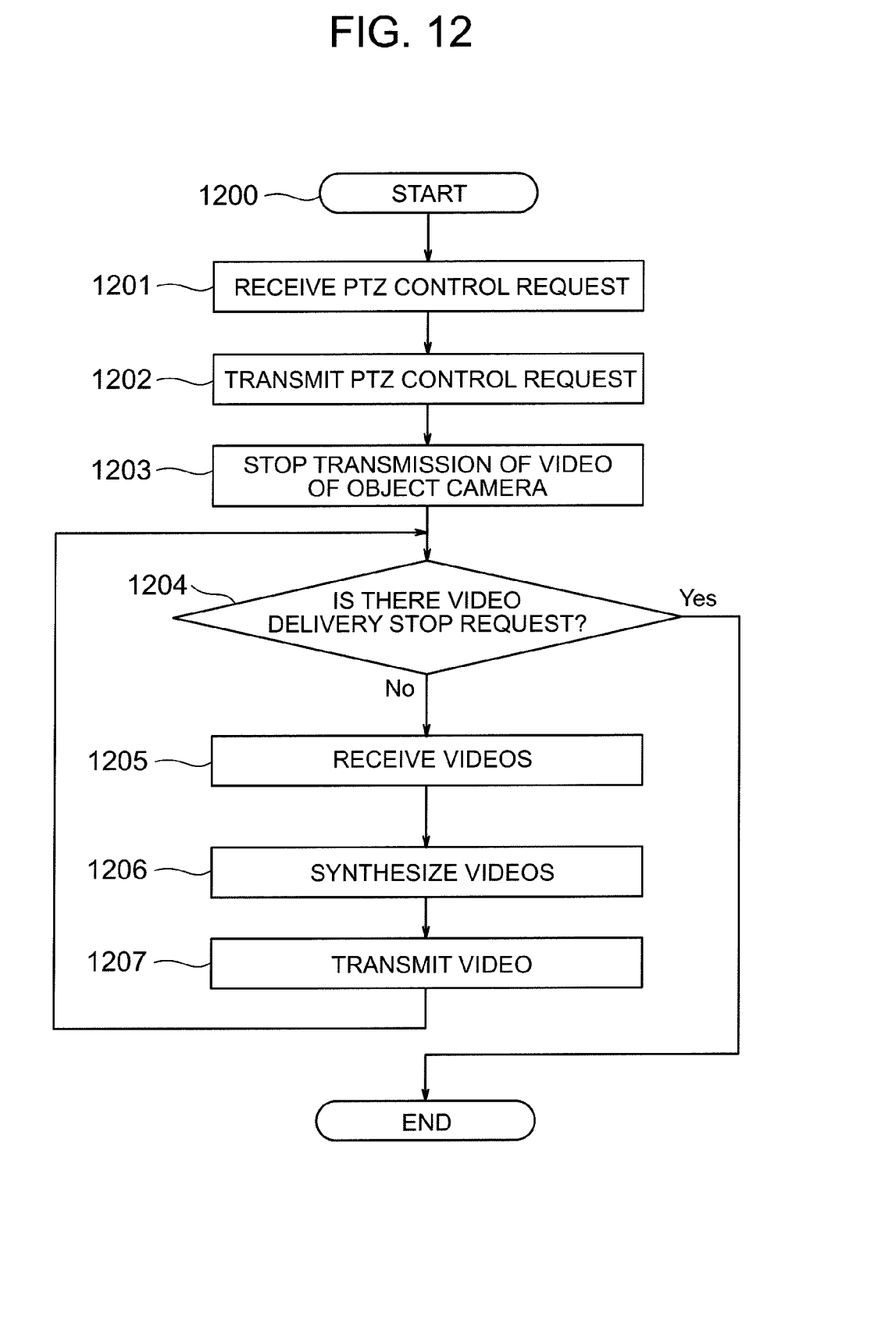
FIG. 12 shows a processing flow at time of a PTZ control request.

FIG. 12 shows a processing flow at time when the monitor camera controller 100 has received a request to restore to the original position in a PTZ control request from the monitor camera controller 205 in order to stop the delivery of the video of the object monitor camera.

The monitor camera controller 205 is acquiring a video of a specific monitor camera through the monitor camera controller 100. The processing shown in FIG. 12 aims at stopping of this video delivery.

At step 1201, the monitor camera controller 100 receives a request to restore a video to the original position as a PTZ control request. At step 1202, the monitor camera controller 100 transmits a request to restore a video to the original position to the object monitor camera as a PTZ control request. At step 1203, delivery of the object camera video to the monitor camera controller 205 is stopped, and the display such as, for example, "being transmitted to head office" shown in FIG. 11 is stopped.

Delivery of a video of a specific monitor camera has been stopped. Hereafter, a decision is made whether to stop video delivery of all of the monitor cameras 201 to 204.

At step 1204, a decision is made whether there is a video delivery stop request from the monitor camera controller 205. If there is a video delivery stop request, the processing is finished. Unless there is a video delivery stop request, the monitor camera controller 100 receives videos of the monitor cameras 201 to 204 at step 1205, synthesizes the videos at step 1206, and transmits a synthetic video to the monitor camera controller 205 at step 1207.

When issuing the request to restore the video to the original position as a PTZ control request at the step 1201, a unique communication protocol may be used, or a standardized communication protocol may be used. For example, in the case of the ONVIF standards, a command such as "GotoHomePosition" or "GotoPreset" may be used.

Figure 13:
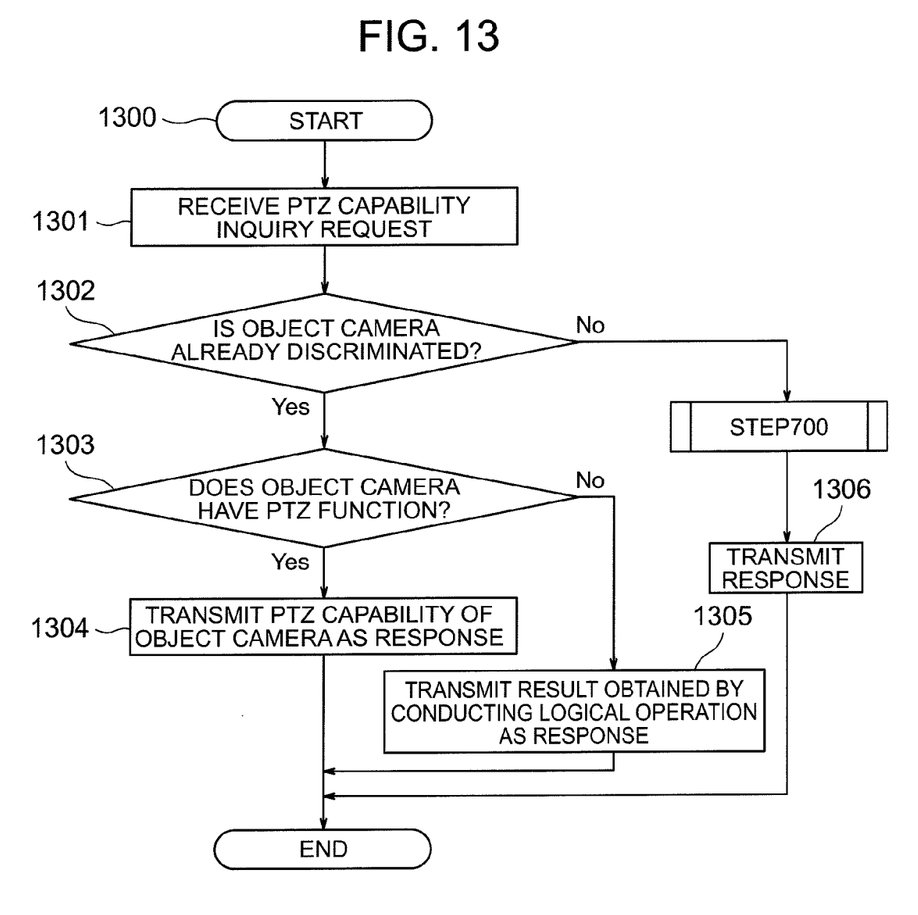
FIG. 13 shows a processing flow at time of a PTZ capability inquiry request.

FIG. 13 shows a processing flow at time when the monitor camera controller 100 has received a PTZ capability inquiry request from the monitor camera controller 205.

At step 1301, a PTZ capability inquiry request is received from the monitor camera controller 205. At step 1302, a decision is made whether a PTZ request to an object monitor camera is already received from the monitor camera controller 205 and whether the object monitor camera is already discriminated. Unless the object monitor camera is determined, the processing proceeds to step 700 and the PTZ capabilities of the monitor cameras are acquired. Or the PTZ capabilities held in the internal memory are transmitted at step 1306. If the object monitor camera is already determined, the processing proceeds to step 1303. At the step 1303, a decision is made whether the object monitor camera has the PTZ function. Here, the PTZ function of each monitor camera previously held in the internal memory or the like is referred to. If the object monitor camera has the PTZ function, the processing proceeds to step 1304 and the PTZ capability of the object camera is transmitted to the monitor camera controller 205 as a response. Unless the object monitor camera has the PTZ function, a result obtained by conducting a logical operation on the PTZ capabilities of the monitor cameras 201 to 204 is transmitted as a response at step 1305. For example, there are four monitor cameras all of which do not have the PTZ functions. The monitor camera controller 100 notifies that there are no PTZ functions in the monitor cameras. The PTZ capability of each monitor camera is expressed by one bit. If the monitor camera has the PTZ function, the PTZ capability is expressed by "1". If the monitor camera does not have the PTZ function, the PTZ capability is expressed by "0". Four bits are required for representing the PTZ functions of four monitor cameras. If all monitor cameras do not have the PTZ function, the monitor camera controller 100 transmits "0000". If only monitor camera D has the PTZ function, the transmitted bits are "0001". If monitor cameras C and D have the PTZ functions, the transmitted bits are "0011".

In the present embodiment, the monitor camera controller 205 issues the PTZ control request to the monitor camera controller 100, and consequently a video of a specific monitor camera out of a plurality of monitor cameras is delivered to the monitor camera controller 205. However, this is not restrictive. For example, it is also possible to give information or position information that makes possible selection of an object monitor camera to the monitor camera controller 100 from the monitor camera controller 205 and thereby select the object monitor camera by using the position converter 103 and transmit the object monitor camera video from the monitor camera controller 100 to the monitor camera controller 205.

If a standardized communication protocol is used as the communication protocol between the monitor camera controller 205 and the monitor camera controller 100 and the communication protocol between the monitor cameras 201 to 204 and the monitor camera controller 100 is a communication protocol having unique specifications, the control request converter 102 conducts control request conversion processing. By conducting this conversion, for example, a monitor camera controller 205 corresponding to the standardized communication protocol can be selected while utilizing existing devices as the monitor cameras. As a result, the width of user's device selection is widened.

As a matter of course, a unique communication protocol may be used as the communication protocol between the monitor camera controller 205 and the monitor camera controller 100. Furthermore, the standardized communication protocol may be used as the communication protocol between the monitor cameras 210 to 204 and the monitor camera controller 100.

In the present embodiment, the function of controlling the monitor cameras 201 to 204, the function of synthesizing the videos from the monitor cameras 201 to 204, the function of being controlled by the monitor camera controller 205, and the like are mounted on the monitor camera controller 100. However, these functions mounted on the monitor camera controller 100 may be mounted on one of the monitor cameras 201 to 204, for example, the monitor camera 201. At this time, the monitor camera 201 behaves like the monitor camera controller 100, and controls other monitor cameras 202 to 204.

In the present embodiment, the number of connected monitor cameras is set equal to four, and videos of four monitor cameras are synthesized as one video. However, any number of monitors may be connected, and videos of any number of monitor cameras may be synthesized as one video. The number of monitor cameras to be synthesized to one video may be fixed, or may be a number set by the user.

Figure 14:
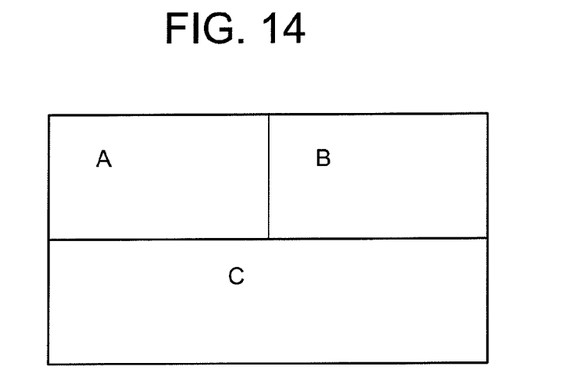
FIG. 14 shows an example of video synthesis.
Figure 15:
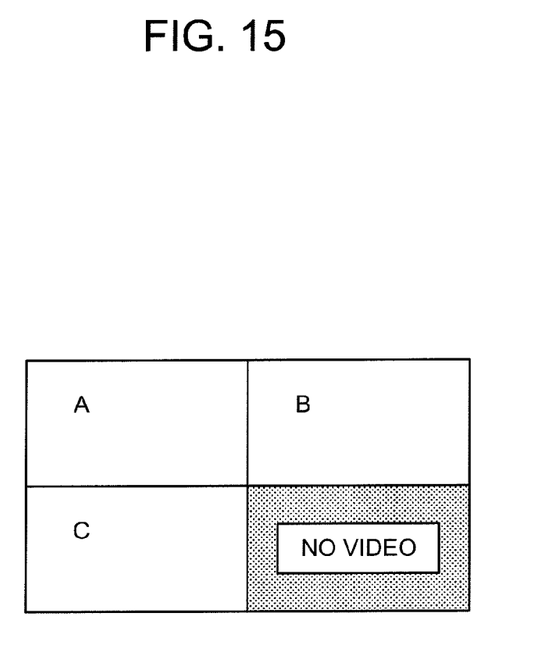
FIG. 15 shows an example of video synthesis.

In some cases, there is a possibility that a partial surplus area occurs on a screen after synthesis. For example, in cases where the number of monitor cameras is three, a state in which there is no video of the part of the monitor camera 204 shown in FIG. 4 occurs. At this time, for example, the video of the monitor camera 203 may be expanded before synthesis as shown in FIG. 14. Or the three videos may be displayed in arbitrary ratios. The position converter 103 retains information corresponding to a video obtained by extending the video of the monitor camera 203, in the internal memory and utilizes the information when conducting position conversion. Or the videos may be synthesized with a video displaying "No video" held previously in the internal memory as shown in FIG. 15. If the monitor camera controller 205 issues the PTZ control request for the area displayed as "No video," a response such as "PTZ control is impossible" or "PTZ control has failed" is transmitted.

The present invention is not restricted to the above-described embodiments, but various modifications are included. For example, the embodiments have been described in detail in order to describe the present invention intelligibly, and each of the embodiments is not necessarily restricted to the configuration having all described components. Furthermore, it is possible to replace a part of a configuration in an embodiment by a part of a configuration in another embodiment, and it is possible to add a part of a configuration in an embodiment to a configuration in another embodiment. Furthermore, as for a part of a configuration in each embodiment, it is possible to conduct addition, deletion, and replacement of a part of a configuration in another embodiment.

As for each of the above-described configurations, functions, processing units, and processing means, a part or the whole thereof may be implemented by hardware by, for example, designing using integrated circuits. Each of the above-described configurations, functions, processing units, and processing means may be implemented by software by using a processor which interprets and executes a program implementing each function. Information such as a program, a table, and a file implementing each function can be stored in a storage device such as a memory, hard disk, or an SSD (Solid State Drive) or recording media such as an IC card or an SD card.

As for control lines and information lines, those considered to be necessary for description are shown. All control lines and information lines on products are not necessarily shown. As a matter of fact, it may be considered that almost all components are connected to each other.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A monitor camera controller capable of controlling a plurality of monitor cameras connected via a network, the monitor camera controller comprising:
    an information receiver configured to receive a first control request from a second monitor camera controller which is connected via the network and which is different from the monitor camera controller, information from the plurality of monitor cameras, or videos of the plurality of monitor cameras;
    an input/output interface configured to receive commands from an input terminal that controls the plurality of monitor cameras;
    a control request converter configured to analyze a received first control request and convert the received first control request to a second control request which can be received by the plurality of monitor cameras, wherein the control request converter is further configured to give preference to pan, tilt and zoom control requests issued from the second monitor camera controller over commands from the input/output interface;
    an information transmitter configured to transmit the second control request to the plurality of monitor cameras;
    a video display configured to display videos received from one or more of the plurality of monitor cameras, wherein if a control request concerning part or all of pan, tilt and zoom for an object monitor camera is issued as the first control request from the second monitor camera controller, the video display displays from the object monitor camera controlled by the second monitor camera controller;

a video synthesizer configured to synthesize videos from the plurality of monitor cameras that are transmitted from the plurality of monitor cameras in response to the second control request transmitted from the information transmitter;

a position converter configured to:

specify positions for videos from one or more of the plurality of monitor cameras, determine the monitor camera for which the command is given, by issuing a capability inquiry request including part or all of pan, tilt, and zoom to the plurality of monitor cameras, select one monitor camera from the plurality of monitor camera as a selected object monitor camera, instruct the information transmitter to transmit video from the selected object monitor camera to the second monitor camera controller; and the information transmitter is configured to:

transmit the video synthesized by the video synthesizer to the second monitor camera controller, and transmit video from the selected object monitor camera to the second monitor camera controller.

2. The monitor camera controller according to claim 1, wherein the information transmitter is further configured to stop transmitting the video synthesized by the video synthesizer when transmitting the video from the selected object monitor camera.

3. The monitor camera controller according to claim 1, wherein the position converter is further configured to:

conduct operation processing on control values concerning part or all of pan, tilt and zoom for the object monitor camera included in the first control request transmitted from the second monitor camera controller; and the information transmitter is further configured to transmit the control values concerning part or all of pan, tilt and zoom for the object monitor camera subjected to the operation processing, to the object monitor camera.

4. The monitor camera controller according to claim 1, wherein in cases where the object monitor camera is discriminated and then the capability inquiry request concerning part or all of pan, tilt and zoom is issued from the second monitor camera controller, if the object monitor camera has a capability of part or all of pan, tilt and zoom, the information transmitter is configured to transmit the capability of the object monitor camera as the response, and if the object monitor camera has no capability of pan, tilt and zoom, the information transmitter is configured to transmit the capability of conducting part or all of pan, tilt and zoom as the response.

5. The monitor camera controller according to claim 1, wherein the position converter is further configured to:

select the object monitor camera based on information for selecting the object monitor camera out of the plurality of monitor cameras or position information, which is included in the first control request.

6. A monitor camera controller capable of controlling a plurality of monitor cameras connected via a network, the monitor camera controller comprising:

an information receiver configured to receive a first control request from a second monitor camera controller which is connected via the network and which is different from the monitor camera controller, information from the plurality of monitor cameras, or videos of the plurality of monitor cameras;

a control request converter configured to analyze a received first control request and convert the received first control request to a second control request which can be received by the plurality of monitor cameras;

an information transmitter configured to transmit the second control request to the plurality of monitor cameras;

a video synthesizer configured to synthesize videos from the plurality of monitor cameras that are transmitted from the plurality of monitor cameras in response to the second control request transmitted from the information transmitter;

a position converter configured to:

specify positions for videos from one or more of the plurality of monitor cameras, determine the monitor camera for which a command is given, by issuing a capability inquiry request including part or all of pan, tilt, and zoom to the plurality of monitor cameras, select one monitor camera from the plurality of monitor camera as a selected object monitor camera, instruct the information transmitter to transmit video from the selected object monitor camera to the second monitor camera controller; and the information transmitter is configured to:

transmit the video synthesized by the video synthesizer to the second monitor camera controller, transmit the video from the selected object monitor camera to the second monitor camera controller; and transmit a control request concerning part or all of pan, tilt and zoom for restoring a direction of the selected object monitor camera to an original position, and stop transmitting the video from the selected object monitor camera to the second monitor camera controller and transmit the video synthesized by the video synthesizer to the second monitor camera controller, if the first control request includes an instruction for restoring the selected object camera to the original position is issued from the second monitor controller.

7. The monitor camera controller according to claim 6, wherein the information transmitter is further configured to stop transmitting the video synthesized by the video synthesizer when transmitting the video from the selected object monitor camera.

8. The monitor camera controller according to claim 6, wherein the position converter is further configured to:

conduct operation processing on control values concerning part or all of pan, tilt and zoom for the object monitor camera included in the first control request transmitted from the second monitor camera controller; and the information transmitter is further configured to transmit the control values concerning part or all of pan, tilt and zoom for the object monitor camera subjected to the operation processing, to the object monitor camera.

9. The monitor camera controller according to claim 6, wherein in cases where the object monitor camera is discriminated and then the capability inquiry request concerning part or all of pan, tilt and zoom is issued from the second monitor camera controller, if the object monitor camera has a capability of part or all of pan, tilt and zoom, the information transmitter is configured to transmit the capability of the object monitor camera as the response, and if the object monitor camera has no capability of pan, tilt and zoom, the information transmitter is configured to transmit the capability of conducting part or all of pan, tilt and zoom as the response.

10. The monitor camera controller according to claim 6, wherein the position converter is further configured to:
select the object monitor camera based on information for selecting the object monitor camera out of the plurality of monitor cameras or position information, which is included in the first control request.

* * * * *